United States Patent Office 2,893,937
Patented July 7, 1959

2,893,937

METHOD OF MAKING POLYMERS

Robert Dow, Austin, Tex., assignor to George S. Nalle, Jr., Austin, Tex.

No Drawing. Application February 8, 1957
Serial No. 638,899

4 Claims. (Cl. 204—158)

This invention relates to the polymerization of unsaturated organic compounds in the presence of light and more particularly to the photopolymerization of compounds with the aid of a light-activated catalyst.

This invention relates more especially to improvements in the polymerizing of styrene, methyl methacrylate, and certain other materials and mixtures of materials, more especially unsaturated ethylenic monomers that are compatible with monomeric styrene. The invention is concerned with processes for making polymers more economically than with former methods of photopolymerization.

It is an object of this invention to provide an improved process for polymerizing by irradiating with light. A more specific object of the invention is to polymerize certain monomers by irradiating with light while the monomer is mixed with ethyl methyl ketone peroxide as a photo initiation catalyst as well as a heat activated catalyst.

In accordance with this invention, polymers and copolymers are produced by exposing a monomer or mixture of monomers to sunlight or to artificial light, such as ultraviolet radiation from a mercury vapor lamp or other ultraviolet source after mixing some of the ethyl methyl ketone peroxide with the monomer or mixture of monomers.

The ethyl methyl ketone peroxide has proven to be particularly effective for making polymers when mixed with monomeric styrene; monomeric methyl styrene; monomeric methyl methacrylate; mixtures of monomeric styrene and butadiene, or monomeric styrene and monomeric acrylonitrile; and for polymerizing monomeric styrene with mixtures of monomers and polymers of any of these compounds.

The monomer must be maintained under a controlled atmosphere from which oxygen is excluded. Nitrogen is a suitable atmosphere; so is a vapor of the monomer, or other inert gas which will not react with or be dissolved in large quantities by the compounds in the mixture which is to be polymerized. The vessel in which the mixture is contained must be closed by structure which will pass radiation of the desired wavelength when sunlight is used, or when using mercury vapor lamps located outside of the vessel in which the monomer is contained.

The process of this invention irradiates with light having a component of a wavelength within the range of from 1800 to 7200 angstroms. The amount of the ethyl methyl ketone peroxide employed as a catalyst is from 0.01 to 1.5% by weight of the material to be polymerized. The use of additional catalyst is wasteful but does not damage the product.

During the polymerization procedure, the temperature should be kept under, and preferably just under, the vaporization point of the monomer-polymer mixture. If necessary, a water bath or other cooling means is used to limit the temperature of the reaction mixture.

In the examples which follow, the compounds to be polymerized were not exposed to the light continuously.

When sunlight was used, the light intensity was weak in the early morning and late afternoon; and was, of course, completely absent at night. When a lamp is used for the light, it may be applied continuously, but the process is more economical if the compound is exposed to the light from the lamp for short lengths of time, for example from one second to one minute; and the light can be extinguished for 1–4 times the length of exposure between subsequent exposures.

Example 1

1,000 moles of styrene monomer were mixed with 0.73 mole ethyl methyl ketone peroxide and exposed in either or both aluminum or ferrous alloy pans that contain no copper with a tight-fitting fused quartz glass cover and under a nitrogen atmosphere. A constant temperature bath held at 100° F. was used. A mercury vapor lamp was placed at a distance of 2 feet, and the light rays were focused on the center of the vessel by use of a parabolic mirror, and the sample exposed for very short lengths of time over a period of 16 hours. The exposures were approximately 10 seconds in duration with intervals of 20 seconds between exposures. At the end of that time the polymer produced was clear with a high molecular weight. The polymer was 97% polymerized. A similar sample with no ethyl methyl ketone peroxide showed little increase in viscosity.

Example 2

1,000 parts of styrene containing 1 part of ethyl methyl ketone peroxide were exposed in fused quartz containers sealed under nitrogen. The samples were put in a constant temperature water bath held at 106.88° F. during daylight periods and exposed for two days to summer sunlight. The polymer produced was hard and clear with high molecular weight. The polymer was 93% polymerized. The samples containing no ethyl methyl ketone peroxide were either just beginning to thicken or still in a thin syrupy state.

Example 3

25 parts of butadiene, 75 parts of styrene monomer, and 0.5 part ethyl methyl ketone peroxide were sealed in a 96% silica flask under the vapor pressure of butadiene with oxygen rigorously excluded. The flask was placed in a water bath and exposed to ultra-violet light for short intervals of time, as in Example 1, for a period of 24 hours. At that time a pliable polymer had formed with only traces of styrene or butadiene not reacted to form dimers of higher molecular weight. Samples containing no ethyl methyl ketone peroxide had much lower yield and the molecular weight was also lower.

Example 4

100 parts of methyl methacrylate containing 0.1 part of ethyl methyl ketone peroxide were sealed in a boro silicate glass flask under a nitrogen atmosphere. The flask was exposed continuously for 45 minutes to a mercury vapor ultraviolet lamp and at the end of that time a clear hard polymer was obtained.

Example 5

100 parts of methyl methacrylate containing 0.5 part of ethyl methyl ketone peroxide were sealed under a nitrogen atmosphere in a boro silicate glass flask and exposed for 1 day to sunlight. A water bath was used to conduct away the heat. At the end of that time a hard, high-molecular weight polymer was obtained. The control sample had not set to a gel by that time.

Example 6

100 parts of methyl styrene containing 1 part of ethyl methyl ketone peroxide were sealed in a fused quartz flask and exposed to summer sunlight for 3 days. The polymer produced upon this length of exposure was hard and not discolored by the peroxide. The polymer had a high molecular weight and low volatile content. The sample with no ethyl methyl ketone peroxide was only slightly thickened after a similar exposure time.

*Example 7*

5 parts acrylonitrile monomer was mixed with 95 parts styrene monomer containing 0.71 parts ethyl methyl ketone peroxide and placed in a glass dish and covered with a glass cover. The sample was irradiated with a mercury vapor ultraviolet lamp for short periods of time, as in Example 1, for a duration of 20 hours. At the end of this time a hard, high-molecular weight polymer was removed. The control sample was of a much lower molecular weight and had just begun to thicken to a gel.

The preferred embodiments of the invention have been described, but changes and modifications can be made without departing from the invention as defined in the claims.

What is claimed is:

1. The process of making a polymer which comprises irradiating, with light having a wavelength component of from 1800 to 7200 angstroms, a photopolymerizable unsaturated organic compound containing at least 0.01 percent by weight of ethyl methyl ketone peroxide, said organic compound being from the group consisting of monomeric styrene, monomeric methyl styrene, monomeric methyl methacrylate, mixtures of monomeric styrene and butadiene, mixtures of monomeric styrene with monomeric acrylonitrile, and mixtures of monomeric styrene with mixtures of monomers and polymers of any of the materials in the group.

2. The process of making a polymer as described in claim 1 and in which the exposure to light of the mixture of ethyl methyl ketone peroxide and monomer is intermittent.

3. The process of making a polymer as described in claim 1 and in which the mixture of ethyl methyl ketone peroxide and monomer is exposed to artificial light and the light is turned off repetitively during the polymerization process.

4. The process of making polymer as described in claim 1, and in which the light, to which the mixture of ethyl methyl ketone peroxide and monomer is exposed, is sunlight.

References Cited in the file of this patent

UNITED STATES PATENTS

| | | |
|---|---|---|
| 1,241,738 | Klatte et al. | Oct. 2, 1917 |
| 2,300,495 | Gerhart | Nov. 3, 1942 |
| 2,505,067 | Sachs | Apr. 25, 1950 |